US008668897B2

(12) United States Patent
Rosenband et al.

(10) Patent No.: US 8,668,897 B2
(45) Date of Patent: Mar. 11, 2014

(54) COMPOSITIONS AND METHODS FOR HYDROGEN GENERATION

(75) Inventors: Valery Rosenband, Haifa (IL); Alon Gany, Haifa (IL)

(73) Assignee: Technion Research & Development Foundation Limited, Haifa (IL)

(*) Notice: Subject to any disclaimer, the term of this patent is extended or adjusted under 35 U.S.C. 154(b) by 980 days.

(21) Appl. No.: 12/348,428

(22) Filed: Jan. 5, 2009

(65) Prior Publication Data
US 2010/0173225 A1    Jul. 8, 2010

(51) Int. Cl.
*C01B 3/00*     (2006.01)
*C01B 3/02*     (2006.01)
*C01B 3/08*     (2006.01)
*C01B 6/00*     (2006.01)
*C01B 6/04*     (2006.01)

(52) U.S. Cl.
USPC .... 423/657; 252/182.35; 423/644; 423/648.1

(58) Field of Classification Search
None
See application file for complete search history.

(56) References Cited

U.S. PATENT DOCUMENTS

| 3,674,702 | A | * | 7/1972 | MacKenzie et al. | 149/19.9 |
| 3,985,866 | A | * | 10/1976 | Oda et al. | 423/657 |
| 4,308,248 | A | * | 12/1981 | Anderson | 423/579 |
| 5,728,464 | A | | 3/1998 | Checketts | |
| 6,969,417 | B2 | * | 11/2005 | Baldwin et al. | 75/363 |
| 2002/0081235 | A1 | | 6/2002 | Baldwin et al. | |

FOREIGN PATENT DOCUMENTS

| CN | 1469841 | 1/2004 |
| EP | 1749796 | 2/2007 |
| EP | 1829820 | 9/2007 |
| WO | WO 02/14213 | 2/2002 |
| WO | WO 2005/005311 | 1/2005 |
| WO | WO 2010/076802 | 7/2010 |

OTHER PUBLICATIONS

International Search Report and the Written Opinion Dated Jun. 16, 2010 From the International Searching Authority Re. Application No. PCT/IL2010/000009.
International Preliminary Report on Patentability Dated Jul. 14, 2011 From the International Bureau of WIPO Re. Application No. PCT/IL2010/000009.
Translation of Notification of Office Action Dated Dec. 5, 2012 From the State Intellectual Property Office of the People's Republic of China Re. Application No. 201080009706.4.
Translation of Search Report Dated Dec. 5, 2012 From the State Intellectual Property Office of the People's Republic of China Re. Application No. 201080009706.4.
Communication Pursuant to Article 94(3) EPC Dated Jun. 18, 2013 From the European Patent Office Re. Application No. 10703989.3.
Translation of Notification of Office Action Dated Aug. 16, 2013 From the State Intellectual Property Office of the People's Republic of China Re. Application No. 201080009706.4.

* cited by examiner

*Primary Examiner* — Patricia L Hailey
*Assistant Examiner* — Colin W Slifka

(57) ABSTRACT

The present invention relates to compositions and methods for producing hydrogen from water involving reacting metal particles with water in the presence of an effective amount of activator. In particular the invention pertains to compositions and methods for producing hydrogen upon reaction of metal particles selected from the group consisting of aluminum (Al), magnesium (Mg), boron (B), silicon (Si), iron (Fe), and zinc (Zn) with water, in the presence of an effective amount of an activator catalyst, wherein the activator is selected from the group consisting of: alkali metals, earth alkali metals, hydrides of alkali metals, hydrides of earth alkali metals, hydroxides of alkali metals, and hydroxides of earth alkali metals.

34 Claims, 5 Drawing Sheets

COMPOSITIONS AND METHODS FOR HYDROGEN GENERATION

FIELD OF THE INVENTION

This invention relates to apparatuses, methods, compositions and processes for generating hydrogen gas in a controlled manner from reaction of metal with water and for using the generated hydrogen.

BACKGROUND OF THE INVENTION

Great efforts have been invested in the search for alternative fuels to reduce dependence on fossil fuels and to eliminate or reduce pollution associated with the burning of fossil fuels. Hydrogen is the most attractive alternative fuel because of its enormous heat of combustion (highest than that of any other material) and most environment friendly products (water vapor). In addition, hydrogen is the most abundant element in the universe.

Despite its widespread availability and obvious virtues, so-far hydrogen has not been utilized as a fuel of choice due to a number of technological problems which have not yet been solved satisfactory. These problems generally relate to devising safe, efficient, and economical methods of production, storage, transport, and utilization of hydrogen in sufficient quantities to make this fuel economically feasible.

Many methods have been described for the generation of hydrogen gas. The most common ones are electrolysis of water, gasification of coal, steam reforming of natural gas, partial oxidation of heavy oils, and the use of solar or nuclear reactor heat to break down steam into its component elements. However, these schemes for production of large quantities of hydrogen gas require major capital equipment, large production capabilities, and an input of significant amount of external energy.

Furthermore, neither of the above methods provides means for hydrogen storage, implying severe problems of storage, transportation, and safety. Hydrogen gas has extremely low density, and is highly explosive with air.

To overcome the problems of storage, handling, and transport of hydrogen, different methods have been proposed for generation of hydrogen on demand at the point of utilization:

Metal Hydrides for Storage and Production of Hydrogen:

certain metal-based compounds absorb hydrogen under moderate pressures (less than 7 MPa) at ambient temperatures, forming reversible metal-hydrogen compounds called hydrides. Metal hydrides can release hydrogen when the pressure is reduced and heat is applied. Although this method is considered a compact hydrogen storage (volume wise), practical hydrides contain relatively low mass fraction of hydrogen (in the commonly used iron titanium hydride the hydrogen mass fraction is only approximately 1.7%), implying low energy density. The production process of hydrides of relatively high hydrogen content is presently complex and very costly.

Reactions of Certain Metals with Water (e.g., alkali metals, magnesium, aluminum) may be considered as a potential source of hydrogen and energy. Aluminum may serve as a very promising candidate for such a reaction because of the high amount of hydrogen (theoretically, 1.24 liter per gram of aluminum at standard conditions), high energy produced, easy and safe handling, availability, and relatively low cost. This reaction is also desirable because the main residue (aluminum hydroxide) is environmentally benign. Aluminum is not reactive in air at ambient conditions, whereas water is readily available and easy to store. In addition, one does not have to deal with hydrogen gas at any stage prior to its in-situ production for a direct use (e.g., for fuel cells, internal combustion engines, gas turbines, battery replacement, marine and underwater propulsion, etc.). Nevertheless, generally aluminum does not react with water (neither with air) in common ambient conditions due to a protective oxide (or hydroxide) layer naturally formed on the metal surface. In common applications, this "passivation" phenomenon is a fortunate property preventing corrosion, as long as the environment is not too acidic or alkaline. At the same time, it practically blocks the aluminum-water reaction. Hence, the execution of the reaction between aluminum and water to generate hydrogen requires activation, supposedly causing continuous disruption of the protective layer.

A number of approaches to increase reactivity of aluminum with water are known in the art:

One approach is a mechanical treatment (cutting or friction) of the aluminum to form fresh metal surfaces which can react with water.

For example, friction of metallic material under water and mechanical fracture of the oxide film accompanying the friction is disclose in U.S. Pat. No. 7,008,609.

K. Uehara, H. Takeshita and H. Kotaka in "Hydrogen gas generation in the wet cutting of aluminum and its alloys" (Journal of Materials Processing Technology, Volume 127, 2002, Pages 174-177) studied bubbling due to hydrogen generation during reaction of fresh aluminum surfaces with water.

Activation of the reaction of fine aluminum particles with water obtained by milling aluminum in water comprising a thermal shock treatment, where aluminum fine particles were repeatedly heated and cooled down, was described in U.S. Pat. No. 7,235,226.

Continuous removal of the passivation layer on aluminum by mechanical means, in order to sustain aluminum assisted water split reaction, has been disclosed in FR Pat. No. 2,465,683.

U.S. Pat. Nos. 5,052,272; 5,143,047; 5,712,442; and 5,789,696 describe controlled hydrogen generators that employ aluminum and water, where disruption of the protective oxide film is achieved by fast electrical heating of the metal above its melting point.

European patent No. 0 055 134 A1 discloses a method for the production of hydrogen by inducing electrical discharge between aluminum wire and aluminum drum both of which are immersed in water. When voltage is applied between the wire and drum, arching discharge takes place, helping disruption of the oxide layer formed on the wire tip, exposing fresh aluminum to the water. Thus, a continuous generation of hydrogen gas is possible when the wire is fed against the drum. This process has two major disadvantages. First, since the process is slow, the heat generated from the reaction is wasted by being dissipated through the water. Second, it is an energy demanding process: about 10 kJ of electrical energy per 1 gram of aluminum is required to sustain the reaction.

A second approach comprises the addition of alkali hydroxide, mainly sodium hydroxide or potassium hydroxide, to the water as disclosed in U.S. Pat. Nos. 2,721,789; 6,506,360; 6,638,493; 6,800,258; 6,834,623; 7,029,778; and US Patent Application 20040081615.

A similar approach comprises the presence of an effective amount of a catalyst in mixture with metal, wherein the catalyst is a water-soluble inorganic salt as disclosed in U.S. Pat. Nos. 3,932,600; 3,985,865; 6,440,385; 6,582,676; and US Patent Application 20050232837.

U.S. Pat. No. 6,582,676 and European patent application EU0417279A1 present the production of hydrogen from a water split reaction using aluminum and a ceramic, particularly calcium/magnesium oxide. Once contacted with water, these compounds cause substantial increase of pH (i.e. create alkaline environment), which stimulates corrosion of Al with accompanying release of hydrogen.

Unfortunately hydroxide chemicals cause very high alkalinity of the resulting products, making them corrosive, dangerous to handle, and potentially polluting to the environment. This increases the cost of the technology and adds safety and pollution problems. A further disadvantage is that the reaction products are not easy to handle and recycle.

Another approach comprises the use of alloys of aluminum with different metals for the reaction with water to produce hydrogen, as discloses in U.S. Pat. Nos. 4,182,748; 4,207,095; 4,324,777; 4,358,291; 4,752,463; 5,867,978; and 6,969,417.

The alloys comprise an alkali metal, mercury, and aluminum combined with a catalytically effective amount of metals comprising one or some of: platinum, palladium, germanium, antimony, gallium, tin, etc. The alloy is obtained by melting of the composition in an inert atmosphere. Sometimes, aluminum constitutes only small part of the alloy mass. Because of the production of the reactive alloy by melting, it is difficult to obtain the reactive material in a powdered form which would be advantageous for fast reaction with water due to the large surface area.

Additionally, amalgamation with, or the use of metals such as mercury; platinum; palladium; gallium; etc. results in an increase in the cost of the hydrogen to be produced. Furthermore, the use of mercury may be particularly objectionable in view of its toxicity. Additionally, the use of considerable quantities of alkali metals is disadvantageous from a process-technology point of view.

To summarize, most of the available methods for hydrogen production from the reaction between aluminum and water pose certain severe disadvantages such as complexity, high cost, toxicity, low yield, slow process, large amounts of an activating agent, etc.

SUMMARY OF THE INVENTION

Hydrogen may be produced by different methods based on chemical decomposition of water: Among them the reaction of metal with acid aqueous solution or water, thermal decomposition of water, and electrolysis of water. The reaction of metals such as zinc or aluminum with acid is relatively straight forward. However, it is very polluting and requiring large quantities of acid and large excess of water. The reaction of metals with water seems to be a promising way for hydrogen production. Nevertheless, most metals (except alkali metals) either do not react with water or undergo very slow, low yield reaction. Thermal decomposition or electrolysis of water to produce hydrogen (and oxygen) can be applied at industrial scale. However, these methods require large quantities of thermal or electric energies, resulting in high production costs and limiting them to special applications and/or facilities. In addition, they pose a significant hydrogen storage problem.

It is an object of the present invention to provide a simplified and improved method for the activation of a base-metal, promoting its spontaneous reaction with water to produce hydrogen and avoiding the difficulties and disadvantages associated with the methods described before. Aluminum, which is a very good candidate for the metal-water reaction because of its availability, no toxicity, and high potential yield of hydrogen, is typically covered by a thin oxide layer resulting from natural oxidation by air. This oxide film prevents spontaneous fast chemical interactions of aluminum with water or oxygen. While this property is beneficial for applications where aluminum is a construction element, avoiding corrosion, it does not permit the reaction of as-received aluminum with water for hydrogen production. The inventors of this invention reveal that aluminum may be activated by treating it with small quantities of lithium or lithium hydride, apparently forming an aluminum-lithium solid solution. The activated aluminum-based composition can then react spontaneously with water even at room temperature and at neutral or close to neutral pH without adding any chemicals to the water.

The invention relates to methods and processes for chemical activation of a base-metal for the reaction with water to produce hydrogen, as well as to specific base-metal/activator compositions. It also reveals ways for controlling the reaction rate. It has been found that the rate of hydrogen production increases with increasing lithium content, with reducing aluminum particle size, and with increasing water temperature.

In addition, the invention demonstrates the possibility for in-situ hydrogen production, making the activated metal functioning as a practical hydrogen and energy storage for variety of applications.

The invention refers in particular to a composition resulting from activation of aluminum by a special treatment with lithium hydride.

The controlled nature of the method allows the production of hydrogen on demand, making the method and process suitable for producing hydrogen for a variety of uses, for example as an energy source to be used in fuel cells or in turbines.

It is therefore an object of the present invention to provide a relatively low cost hydrogen-producing composition enabling the production of hydrogen gas, optionally of a high purity, optionally at a high efficiency, by spontaneous reaction with water.

Another object of the present invention is to provide a method for producing hydrogen at a low cost and at a high efficiency without use of a large quantity of electric or thermal energy.

Another object of the present invention is to provide a process for the production of the hydrogen-producing composition.

According to a preferred embodiment of the present invention these and other objects are achieved by providing a hydrogen-producing composition comprising an aluminum-lithium mixture consisting essentially of 1 to 10% of lithium and the balance being aluminum and inevitable impurities. Optionally, the hydrogen-producing composition comprising an aluminum-lithium mixture consisting essentially of 0.1 to 1% lithium and the balance being aluminum and inevitable impurities.

Optionally, the hydrogen-producing composition comprising an aluminum-lithium mixture consisting essentially of 10 to 20% lithium and the balance being aluminum and inevitable impurities.

Optionally, the hydrogen-producing composition comprising an aluminum-lithium mixture consisting essentially of 1 to 2.5% lithium and the balance being aluminum and inevitable impurities.

Preferably the aluminum-lithium mixture is in the form of aluminum-lithium solid solution.

According to an embodiment of the present invention the composition is based on aluminum of different possible physical forms, such as: powders, flakes, chips, pieces, plates, sheets, bands and the like.

According to the present invention the composition may be used at different water temperatures, including room temperature, and different aluminum/water mass ratios.

According to the present invention the composition may be used with any type of water (pure, tap or sea) to produce hydrogen gas.

According to the present invention the composition may be also used with urine (particularly for manned space missions) to utilize and manage the liquid wastes and to produce hydrogen gas.

The invention is also directed to methods by which said lithium-aluminum mixture or solid solution may be used to generate hydrogen gas of high purity at high efficiency, and to the possible combination of these methods with energy/electricity generation facilities, such as fuel cells, gas turbines, internal combustion engines, and the like, for various applications (e.g., automotive, air vehicles, marine and underwater vehicles, electricity generators, and battery replacement for electronic devices).

According to an exemplary embodiment of the invention, a composition for producing hydrogen upon reaction of said composition with water, is provided said composition comprising: a) base metal selected from a group comprising: aluminum (Al), magnesium (Mg), boron (B), silicon (Si), iron (Fe), and zinc (Zn); and b) an effective amount of an activator.

In some embodiments the activator is selected from the group consisting of: alkali metals, earth alkali metals, hydrides of alkali metals, hydrides of earth alkali metals, hydroxides of alkali metals, and hydroxides of earth alkali metals.

In some embodiments the said alkali metals is selected from the group comprising: lithium (Li), sodium (Na) and potassium (K).

In some embodiments the base metal is configured in a physical form having large ratio between surface area and volume.

In some embodiments the base metal is configured in a physical form selected from a group comprising: powders, particles, flakes, chips, pieces, plates, sheets, bands and the like.

In some embodiments the effective amount of said activator and said base metal are in a ratio of below 1:5 by weight.

In some embodiments the effective amount of said activator and said base metal are in a ratio of below 1:10 by weight.

In some embodiments the effective amount of said activator and said base metal are in a ratio of below 1:30 by weight.

In some embodiments the base metal and said activator are in intimate physical contact.

In some embodiments the intimate physical contact is achieved by deposition of said activator on the surface of said base metal.

In some embodiments the deposition comprises dissolving the activator in a non-aqueous solvent.

In some embodiments the deposition comprises adding the base metal to a solution of said activator in the non-aqueous solution of said non-aqueous solvent.

In some embodiments the deposition comprises evaporation of said solvent.

In some embodiments the said non-aqueous solvent is liquid ethyl ether anhydrous.

In some embodiments the intimate physical contact is achieved by heating said base metal with said activator deposited on its surface.

In some embodiments the heating is done at temperature below melting point of the base metal.

In some embodiments the heating is done in inert gas atmosphere.

In some embodiments the inert gas is selected from a group comprising: argon, helium, nitrogen and hydrogen.

In some embodiments the heating results in diffusion of said activator or either of its chemical components from the surface of said base metal to inner layers of said base metal.

In some embodiments the diffusion of said activator from the surface of said base metal to inner layers of said base metal substantially produces a uniform distribution of said activator in volume of said base metal.

In some embodiments the composition presents a solid solution of said activator or either of its chemical components in said base metal.

In some embodiments the base metal is aluminum (Al).

In some embodiments the activator is lithium hydride.

In some embodiments the inert gas is argon.

According to an exemplary embodiment of the invention, a method for producing composition for producing hydrogen upon reaction of said composition with water is provided, comprising the step of: providing base metal selected from a group comprising: aluminum (Al), magnesium (Mg), boron (B), silicon (Si), iron (Fe), and zinc (Zn); and adding an effective amount of an activator.

In some embodiments the activator is selected from the group consisting of: alkali metals, earth alkali metals, hydrides of alkali metals, hydrides of earth alkali metals, hydroxides of alkali metals, and hydroxides of earth alkali metals.

In some embodiments the alkali metals is selected from a group comprising: lithium (Li), sodium (Na) and potassium (K).

In some embodiments the metal is configured in a physical form selected from a group comprising: powders, particles, flakes, chips, pieces, plates, sheets, bands and the like.

In some embodiments the effective amount of said activator and said base metal are in a ratio of below 1:5 by weight.

In some embodiments the step of adding an effective amount of an activator comprises deposition of said activator on the surface of said base metal.

In some embodiments the deposition comprises dissolving the activator in a non-aqueous solvent.

In some embodiments the said deposition comprises adding the base metal to a solution of said activator in the non-aqueous solution of said non-aqueous solvent.

In some embodiments the deposition further comprises evaporation of said solvent.

In some embodiments the non-aqueous solvent is liquid ethyl ether anhydrous.

In some embodiments the method further comprising heating said base metal with said activator deposited on its surface.

In some embodiments the heating is done at temperature below melting point of the base metal.

In some embodiments the heating is done in inert gas atmosphere.

In some embodiments the heating results in diffusion of said activator or either of its chemical components from the surface of said base metal to inner layers of said base metal.

In some embodiments the composition presents a solid solution of said activator or either of its chemical components in said base metal.

In some embodiments the base metal is aluminum (Al).

In some embodiments the activator is lithium hydride.

In some embodiments the inert gas is argon.

According to an exemplary embodiment of the invention, a method for producing hydrogen is provided, comprising:

reacting base metal selected from the group comprising: aluminum (Al), magnesium (Mg), boron (B), silicon (Si), iron (Fe), and zinc (Zn) with water in the presence of an effective amount of activator to facilitate the reacting of said base metal with water to produce reaction products which include hydrogen, wherein the activator is selected from the group consisting: alkali metals, lithium (Li), sodium (Na) and potassium (K), hydrides of these alkali metals and hydroxides of these alkali metals.

In some embodiments the activator and said base metal are present in a ratio of below 1:5 by weight.

In some embodiments the base metal and said activator are added into water to cause the hydrogen producing reaction.

In some embodiments the base metal and said activator are in intimate physical contact.

In some embodiments the said intimate physical contact is achieved by deposition of said activator on the surface of said base metal.

In some embodiments the deposition is preceded by dissolving said activator in a non-aqueous solvent.

In some embodiments the deposition is preceded by addition of said base metal to a non-aqueous solution of activator in said non-aqueous solvent.

In some embodiments the deposition comprises evaporation of said solvent.

In some embodiments the evaporation comprising recovering and reusing said solvent.

In some embodiments the solvent is ethyl ether anhydrous.

In some embodiments the intimate physical contact is achieved by annealing of said base metal with said activator deposited on its surface.

In some embodiments the annealing is realized at temperature below melting point of base metal.

In some embodiments the said annealing is realized in inert gas atmosphere.

In some embodiments the inert gas is selected from a group comprising: argon, helium, nitrogen or hydrogen.

In some embodiments the annealing results in diffusion of said activator or either of its chemical components from the surface of said base metal into the bulk volume of the base metal.

In some embodiments the base metal and said activator or either of its chemical components present a solid solution.

In some embodiments the base metal is aluminum (Al).

In some embodiments the activator is lithium hydride.

In some embodiments the inert gas is argon.

In some embodiments the reaction is at a pH of between 4 and 10.

In some embodiments the temperature of said water is between 5-100° C.

In some embodiments the water is selected from the group comprising: pure water, tap water, river water, lake water, rain water, waste water, and marine water.

In some embodiments urine is used instead of water.

In some embodiments the urine is used for hydrogen production in a manned spacecraft.

In some embodiments the reaction is used for waste management.

In some embodiments the hydrogen is used for a fuel cell to produce power (electricity) and drinking water.

According to an exemplary embodiment of the invention, a method is provided for producing hydrogen comprising: reacting the comprising: a) base metal selected from a group comprising: aluminum (Al), magnesium (Mg), boron (B), silicon (Si), iron (Fe), and zinc (Zn); and b) an effective amount of an activator using water at a pH of between 4 and 10 and temperature between 5 and 100° C.

According to an exemplary embodiment of the invention, a base metal-activator system is provided for generating hydrogen from water split reaction, said system comprising: a) a composition comprising: a) base metal selected from a group comprising: aluminum (Al), magnesium (Mg), boron (B), silicon (Si), iron (Fe), and zinc (Zn); and b) an effective amount of an activator; b) water; and c) means for containing the system.

According to an exemplary embodiment of the invention, a base metal-activator system for generating hydrogen from water split reaction is provided, wherein rate of said reaction is controlled by the metal particle size, amount of activator, time and temperature of annealing process, water temperature, and mass ratio between metal-activator system and water.

In some embodiments the system has been adapted for a device requiring a hydrogen source.

In some embodiments the device is a hydrogen fuel cell.

In some embodiments the device is an internal combustion engine.

In some embodiments the device is a gas turbine.

In some embodiments the hydrogen is used for power generation.

In some embodiments the power generation is accomplished via hydrogen fuel cell.

In some embodiments the device is used for power (electricity) generation.

In some embodiments the power generation is used in underwater vehicles.

In some embodiments the power generation is used in aeronautical (flying) vehicles.

In some embodiments the power generation is used in automotive vehicles.

In some embodiments the power generation is used in robots.

In some embodiments the power generation is used in electricity generators.

In some embodiments the power generation is used as battery replacement for electronic devices.

In some embodiments the system further comprising means for utilizing heat generated by said system.

In some embodiments the composition serves as energy and hydrogen storage.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF PREFERRED EMBODIMENTS

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The terms "comprises", "comprising", "includes", "including", and "having" together with their conjugates mean "including but not limited to".

The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements were omitted from some of the drawings. Some optional elements may be drawn in dashed lines.

Figure 1:
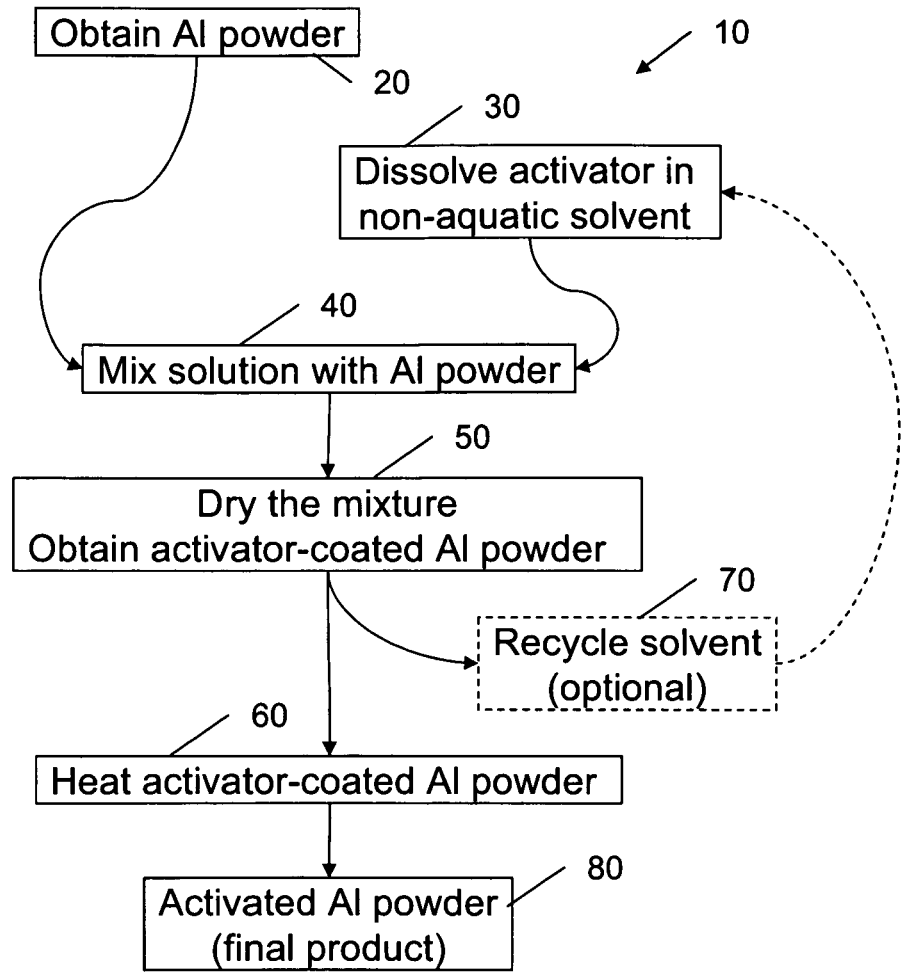
FIG. 1 schematically depicts a method for producing activated aluminum powder according to an exemplary embodiment of the current invention.

FIG. 1 schematically depicts a method for producing activated aluminum powder according to an exemplary preferred embodiment of the current invention.

According to a preferred embodiment of the present invention, the hydrogen producing composition (referred here as activated aluminum powder) comprising an aluminum/lithium solid solution containing 1% to 10% lithium may be produced by a powder metallurgy process.

In the first stage of this process 30, necessary amount of activator, preferably lithium hydride, is dissolved in a non-aqueous solvent, preferably ethyl ether anhydrous, preferably at ambient or slightly elevated temperature.

The necessary amount of aluminum powder 20 is added to the dissolved lithium hydride solution and all materials are constantly mixed 40. Preferably, fine aluminum powder is used to enhance the aluminum activation process and to obtain large surface area of the final product which enables high rate of hydrogen generation. Small particles are preferred for the production of the activated Al as well, because the Li can diffuse into the particles more easily since the distance is shorter. Preferably, aluminum particles of average size of 5 to 30 micrometers are used. However, larger or smaller particles may be used as well. Such powders are commercially available.

After evaporation of the solvent, for example ethyl ether 50, lithium hydride deposits on the surface of aluminum. Thereby, practically uniform distribution of lithium hydride is achieved as well as its good contact with aluminum surfaces.

Preferably, the solvent is recovered 70 for re-use.

The aluminum coated by lithium hydride is then heated 60, preferably in a closed reactor in an inert gas atmosphere to a temperature below aluminum's melting point and is held at that temperature for duration of time. Preferably, the aluminum coated by lithium hydride is held at temperature of about 400° C. for duration of three hours. However, higher or lower temperature as well as shorter or longer durations may be used. The temperature and the persistence time may depend on the amount of lithium hydride and size of the aluminum particles used.

After cooling the reactor is opened and material, activated aluminum powder 80, is pulled out.

It should be noted that some or all the steps of the method according to the current invention may be done in continuous manufacturing system.

According to an exemplary embodiment of the current invention, during the heating (annealing) step, the atoms of lithium diffuse into the aluminum matrix and form, in accordance with the Al—Li system phase diagram, an aluminum/lithium solid solution, with uniform distribution of the lithium atoms within the total volume of aluminum. However, shortening the annealing time may cause a non-uniform distribution of the lithium.

According to another exemplary embodiment of the current invention, during the heating (annealing) step, the atoms of lithium and hydrogen diffuse into matrix of aluminum and form an aluminum/lithium/hydrogen solid solution.

It is important to note that because annealing stage may proceed at relatively low temperature, below the aluminum melting point, the form of the produced activated aluminum/lithium composition practically does not change. If, for instance, aluminum powder was initially used, the final aluminum/lithium composition will also present a powder of practically the same particle size distribution. Because of the big reaction surface of powder, high rate of reaction with water, and thus high rate of hydrogen production, may be achieved.

Alternative methods of producing activated aluminum powder according to variations of the current inventions are:
1. Combining the step of evaporation of ethyl ether 50 with the step of heating 60 of the coated aluminum powder.
2. Using other reactive metal, metal hydride or metal hydroxide instead of lithium hydride as activator. For example: Li, Na, K, Ca, Mg, NaH, KH, MgH2, CaH2, LiOH, NaOH, KOH, Ca(OH)2, and the like.
3. Replacing the ethyl ether anhydrous with another solvent.
4. Skipping the step of heating 60 of the coated aluminum powder, thus producing lithium hydride coated aluminum powder after solvent evaporation 60.
5. Preparing activated aluminum powder for example by wet or dry Mixing, for example in a ball drum mixer, a mixture of aluminum powder and lithium hydride powder. The rigorous mixing creates strong association of the lithium hydride with the aluminum particles. Optionally, the mixture is heat treated during or after the mixing.
6. Simply mix aluminum powder and lithium hydride powder and use the resulting mixture for hydrogen gas production.
7. Simply introduce the aluminum powder and lithium hydride (or lithium hydroxide) powder into water to commence the hydrogen generation reaction.

The hydrogen-producing composition according to the present invention actively reacts with water even at room temperature and produces hydrogen gas. The rate and extent of the aluminum/water reaction and thus the rate and extent of the hydrogen evolution depend on the physical form of aluminum used, temperature of water, conditions of activated aluminum preparation, relative amount of lithium hydride, and aluminum/water mass ratio.

The advantage of the current invention is the low content (typically, within the 1-10 wt % range and even less) of lithium hydride used as accelerator of the reaction of aluminum with water. As low as 1 wt % of lithium hydride is enough for fast reaction of aluminum with water and utilization of the aluminum for hydrogen production. It is possible that the presence of reactive lithium atoms in intimate contact with the aluminum causes continuous destruction of the oxide layer or making this layer non-protective, hence enhancing the aluminum-water reaction. Taking into account that lithium hydride also reacts with water and produces hydrogen, all the mass of material takes part in the reaction with water and in the hydrogen production.

To verify the effectiveness of the activated aluminum powder several experiments were done:

The above general description of the novel method is supported through examples of experimental results. Experiments were carried out to measure the volume of hydrogen gas produced in the reaction of aluminum powder activated with lithium hydride, as described above, with water. The amount of hydrogen released was measured by water displacement, and the extent of reaction was related to the theoretical hydrogen amount that would be obtained from a complete Al/water reaction.

Figure 2:
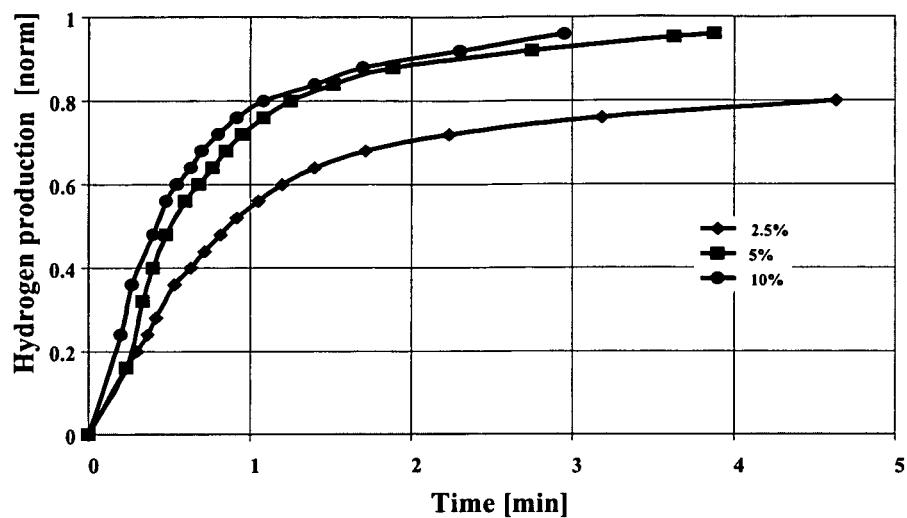
FIG. 2 depicts a graph showing extent of hydrogen production vs. time for different mass fractions of activator used for activation of aluminum powder according to exemplary embodiment of the current invention.

FIG. 2 depicts a graph showing extent of hydrogen production vs. time using different mass fractions of activator for the aluminum powder activation according to exemplary embodiment of the current invention.

In this disclosure, "extent of reaction" is related to a complete aluminum-water reaction, where one gram of Al gives 1245 ml of $H_2$ in standard conditions.

Forty grams of aluminum powder of 5 μm mean particle size were mixed respectively with 1, 2 and 4 g of lithium hydride powder dissolved in 40 ml of ethyl ether anhydrous. After evaporation of the ether during continuous mixing at room temperature, three aluminum-lithium hydride compositions with lithium hydride/aluminum ratio of 2.5, 5 and 10 wt % respectively were obtained. These powders were annealed for three hours in a closed reactor in a flow of argon at temperature of 400° C. After cooling, 0.2 g of each powder was put in separate vessels containing 50 ml of tap water kept by a thermostat at a temperature of 80° C.

FIG. 2 shows hydrogen production vs. time normalized to the maximum amount of hydrogen that may be generated with complete reaction of the available aluminum for different fractions of activator. It was found that the higher the content of activator (lithium hydride), the more extensive was the reaction of activated aluminum powder with water, though the rates of the hydrogen evolution for the compositions with 5 and 10 wt % of lithium hydride were close to one another.

Figure 3:
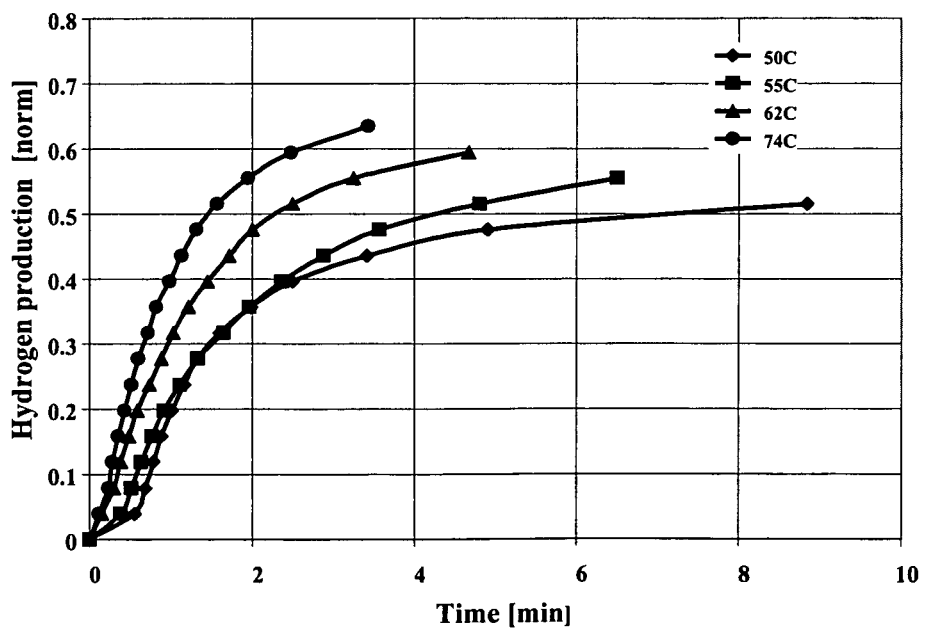
FIG. 3 depicts a graph showing extent of hydrogen production vs. time at different water temperatures according to exemplary embodiment of the current invention.

FIG. 3 depicts a graph showing extent of hydrogen production vs. time at different water temperatures according to exemplary embodiment of the current invention.

Forty g of aluminum powder of 10 μm mean particle size were mixed with 1 g of lithium hydride powder dissolved in 40 ml of ethyl ether anhydrous. After evaporation of the ether during continuous mixing at room temperature, a powder comprising lithium hydride/aluminum ratio of 2.5 wt % was obtained. This powder was annealed for three hours in a closed reactor in a flow of argon at temperature of 400° C. After cooling, portions of powder of 0.6 g each were put in separate vessels containing 50 ml of tap water at constant temperatures (kept by thermostat) of 50, 55, 62 and 74° C., respectively.

As seen in FIG. 3, the rate of aluminum reaction with water strongly depends on the water temperature, and the higher the water temperature the higher is the rate of hydrogen production.

Figure 4:
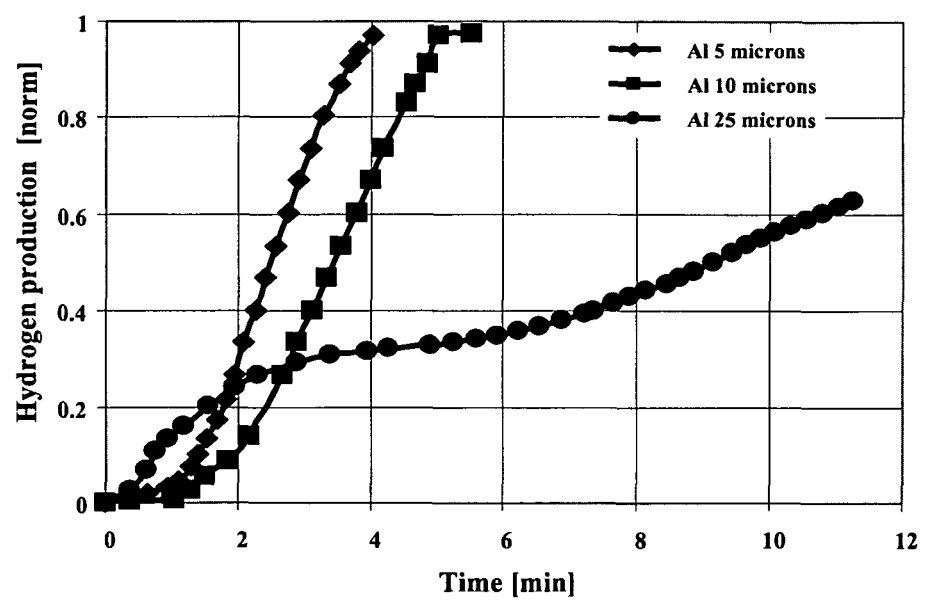
FIG. 4 depicts a graph showing extent of hydrogen production vs. time for different particle sizes of activated aluminum powder according to exemplary embodiment of the current invention.

FIG. 4 depicts a graph showing the extent of hydrogen production vs. time for different particle sizes of aluminum powder according to exemplary embodiment of the current invention.

Forty g of aluminum powders of 5, 10 and 25 μm mean particle size, respectively, were mixed separately with 1 g of lithium hydride powder dissolved in 40 ml of ethyl ether anhydrous. After evaporation of the ether during continuous mixing at room temperature, three powders comprising lithium hydride/aluminum ratio of 2.5 wt % were obtained having substantially the original particle sizes. These powders were annealed for three hours in a closed reactor in a flow of argon at temperature of 400° C. After cooling, 6 g of each powder were put in a separate vessel containing 50 ml of tap water at room temperature. The water temperature increased during process (contrary to the isothermal experiments) due to the exothermic reaction of activated aluminum with water.

The influence of the aluminum particle size on the hydrogen production vs. time in non-isothermal regime is shown in FIG. 4. The smaller the particle size (corresponding to a larger reaction surface of powder), the higher was the rate of hydrogen production. For the smaller particle size powders hydrogen production corresponding to practically full reaction was obtained within few minutes.

Figure 5:
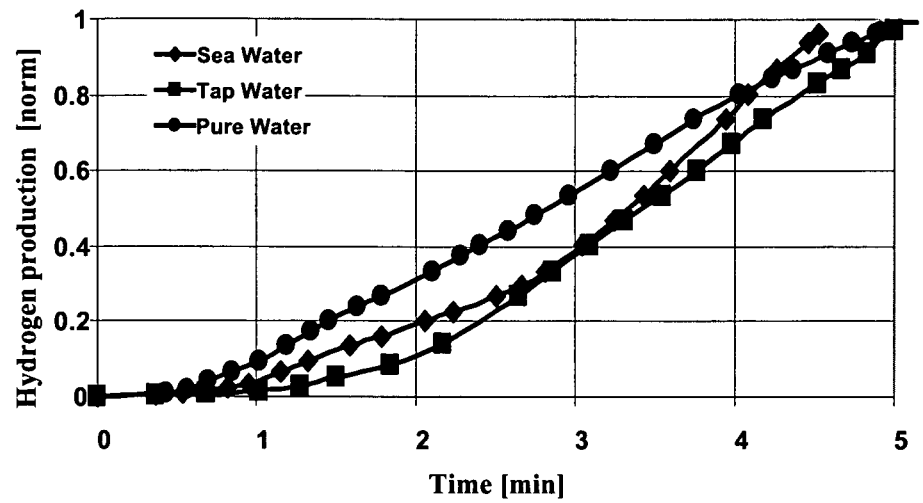
FIG. 5 depicts a graph showing extent of hydrogen production vs. time for different types of water according to exemplary embodiment of the current invention.

FIG. 5 depicts a graph showing extent of hydrogen production vs. time for different types of water according to exemplary embodiment of the current invention.

To study the possible influence of the type of water on the rate of activated aluminum/water reaction, pure water, tap water, and sea water containing 2.8 wt % of NaCl were used in the experiments.

Forty g of aluminum powder of 10 μm mean particle size were mixed with 1 g of lithium hydride powder dissolved in 40 ml of ethyl ether anhydrous. After evaporation of the ether during continuous mixing at room temperature, a powder comprising lithium hydride/aluminum ratio of 2.5 wt % was obtained. The powder was annealed for three hours in a closed reactor in a flow of argon at temperature of 400° C.

After cooling portions of 6 g of the activated aluminum powder produced by the above method were placed in separate vessels containing 50 ml of the different types of water at room temperature.

From FIG. 5 it can be seen, that the rate of reaction of activated aluminum powder with water practically does not depend on the water type. This result may be important for the potential application of activated aluminum powder for water and underwater propulsion and power generation and for applications where water quality is low or cannot be guaranteed. It should also be noted that the amount of generated hydrogen as measured is also virtually unaffected by water quality.

Figure 6:
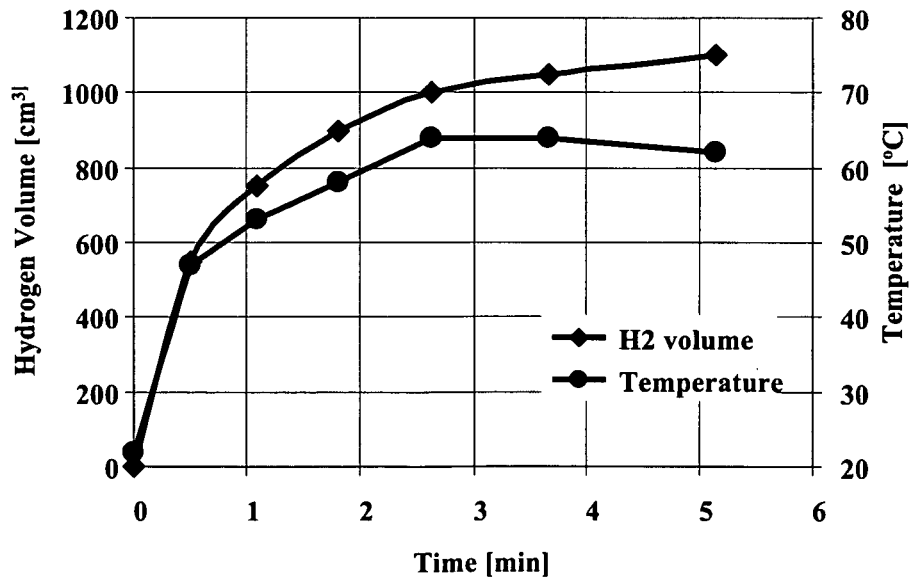
FIG. 6 depicts a graph showing hydrogen production and temperature vs. time in reaction of activated aluminum powder with urine according to exemplary embodiment of the current invention.

FIG. 6 depicts a graph showing hydrogen production volume vs. time and temperature vs. time in reaction of activated aluminum powder with urine according to exemplary embodiment of the current invention.

The reaction of activated aluminum with urine is of particular interest for management of liquid wastes and their utilization for production of hydrogen for power generation in manned space missions or in places where water is in shortage such as desert.

Forty g of aluminum powder of 5 μm mean particle size were mixed with 2 g of lithium hydride powder dissolved in 40 ml of ethyl ether anhydrous. After evaporation of ether during continuous mixing at room temperature, a powder comprising lithium hydride/aluminum ratio of 5 wt % was obtained. The powder was annealed for three hours in a closed reactor in a flow of argon at temperature 400° C. After cooling, 3.8 g of the activated aluminum powder produced by the described method were mixed at room temperature with 50 ml of human urine.

FIG. 6 shows that the activated aluminum powder actively reacts exothermically not only with water but with urine as well producing hydrogen and increasing temperature. In this experiment, the reaction caused an increase of temperature from room temperature (~22° C.) to a maximum of ~65° within ~3 minutes.

Figure 7:
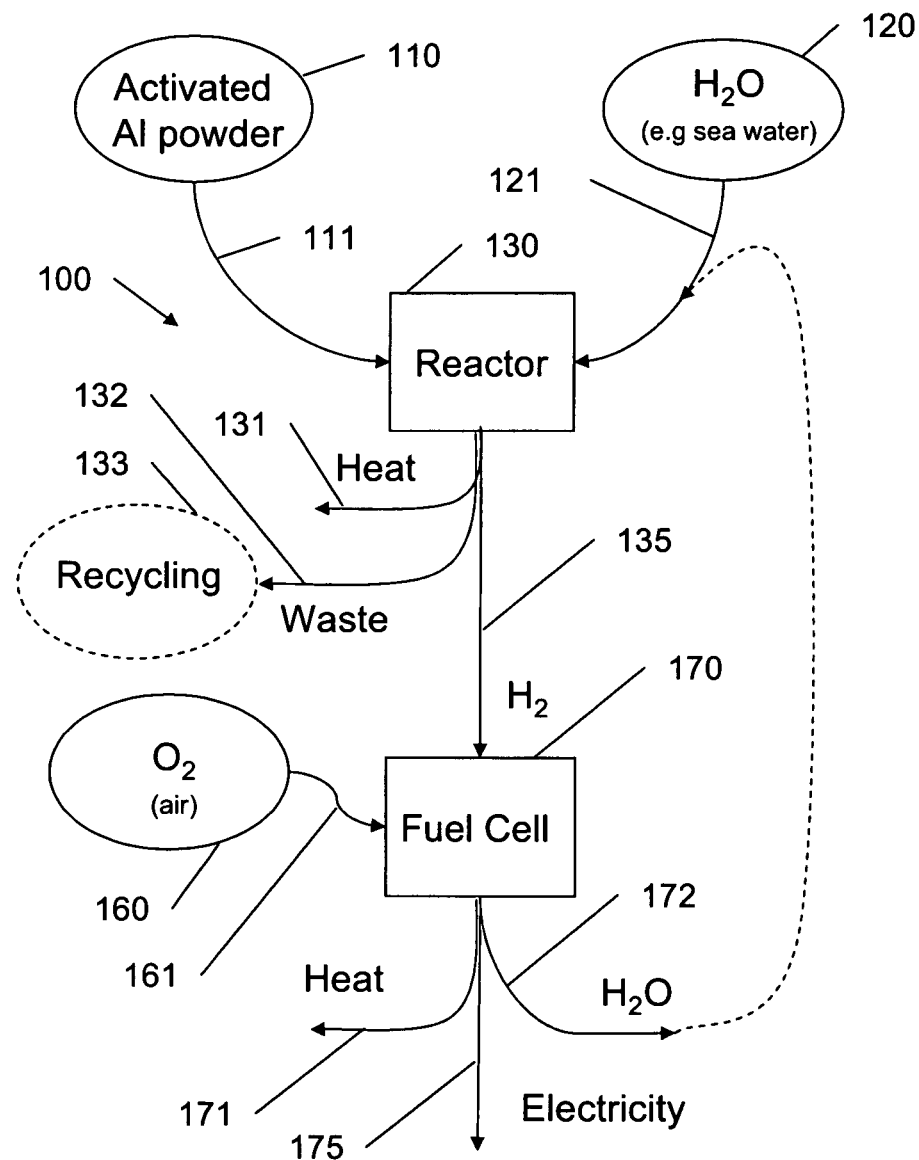
FIG. 7 schematically depicts a system for utilizing hydrogen production according to an exemplary embodiment of the current invention.

FIG. 7 schematically depicts a system 100 for utilizing hydrogen production according to an exemplary embodiment of the current invention.

According to the current invention, activated aluminum powder 111 manufactured according to any of the methods disclosed herein is used for the production of hydrogen which is then preferably used for production of electrical power.

Activated aluminum powder 111 may be held in a separate compartment 110 and introduced in quanta or continuously into reactor 130. Alternatively, reactor 130 may be pre-loaded with an amount of activated aluminum powder.

Water 121 is then mixed with the activated aluminum powder in reactor 130. Water 121 may be held in a separate compartment 120 and introduced in quanta or continuously into reactor 130. Alternatively, reactor 130 may be pre-loaded with an amount of water 121 and activated aluminum powder is then added. In some embodiments water reservoir 120 is used. Alternatively, available water may be used for example in surface ships or submarines where sea or fresh water is available or in locations where running water, lakes or rivers may be used as source of water. As mentioned above, animal or human urine may be used instead of water, specifically in space missions, in remote locations or as an emergency source of power or hydrogen.

Reaction of water and activated aluminum powder produces:

Heat 131, which may be removed by passive or active cooling or preferably used, for example: to heat the reactor in order to optimize its performance; to pre-heat reactive materials such as water, activated aluminum powder, hydrogen or oxygen; to dry the reaction product to solid powder; to produce electricity via low temperature power cycle, or to provide heating to unrelated processes.

Hydrogen gas 135 which is preferably used for energy generation, for example by using fuel cell or internal combustion engine or a gas turbine, or for use wherever hydrogen gas is needed such as flying whether balloons or chemical industry.

Spent reaction products 132 which may be in the form of water and spent powder mixture or dry powder.

Preferably, aluminum and lithium are recovered from the spent products 132 in a local or remote recycling facility 133. Alternatively, spent products 132 are discarded. It should be noted that the cost of aluminum is low, and the amount of lithium used is small, and the spent reaction products may have low toxicity and low environmental impact, thus discarding the spent product may be a viable option. This is in contrast to some methods used in the art, for instance amalgams of aluminum with mercury, or expensive additives of gallium, indium, etc.

In a preferred exemplary embodiment of the invention, generated hydrogen gas 135 is fed into fuel cell 170 where it is combined with oxygen 161.

Oxygen 161 may be stored in the form of liquid oxygen in a cryostat 160 as is currently done for example in submarines and space missions. Additionally or alternatively, oxygen may be stored in compressed form. According to an exemplary embodiment, air is used. Specifically this option is useful for operation of surface vehicles and flying systems such as unmanned miniature airplanes.

Reaction of hydrogen and oxygen in the fuel cell produces:

Heat 171, which may be removed by passive or active cooling or preferably used, as discussed above.

Electrical power 175 which is preferably the main purpose of the system 100. Electrical power may be used for example for driving electrical motors in submarines, electrical automotive vehicles, miniature airplanes, emergency power supply, etc.

Water 172 produced in the fuel cell may be discarded; used as drinking water (even if the original water used in reactor 130 was un-drinkable); or added to water 121 used in reactor 130, thus saving as much as half the water needed for the operation. In application where water is not available, and space or weight is a limitation (such as in flying missions), re-use of water 172 may substantially reduce the size and weight of water reservoir 120.

The invention claimed is:

1. A composition for producing hydrogen upon reaction of the composition with water, the composition comprising a metal and an activator, said metal being aluminum (Al) and said activator being lithium hydride, said activator being in an amount that facilitates the reacting of said metal with water to produce reaction products which include hydrogen, wherein the composition is in a form of a solid solution of said activator or of chemical components thereof in said metal, and an amount of said activator and an amount of said aluminum are in a ratio of below 1:30 by weight.

2. The composition according to claim 1, wherein said metal is configured in a physical form selected from a group comprising powders, particles, flakes, chips, pieces, plates, sheets and bands.

3. The composition according to claim 1, wherein said solid solution is achieved by deposition of said activator on the surface of said metal.

4. The composition according to claim 3, wherein said deposition comprises dissolving the activator in a non-aqueous solvent.

5. The composition according to claim 4, wherein said deposition comprises adding the metal to a solution of said activator in said non-aqueous solvent.

6. The composition according to claim 5, wherein said deposition comprises evaporation of said solvent.

7. The composition according to claim 4, wherein said non-aqueous solvent is liquid ethyl ether anhydrous.

8. The composition according to claim 3, wherein said solid solution is achieved by heating said metal having said activator deposited on its surface.

9. The composition according to claim 8, wherein said heating is done at temperature below melting point of the metal.

10. The composition according to claim 8, wherein said heating is done in inert gas atmosphere.

11. The composition according to claim 8, wherein said heating results in diffusion of said activator or of chemical components thereof from the surface of said metal to inner layers of said metal.

12. The composition according to claim 11, wherein said diffusion of said activator from the surface of said metal to inner layers of said metal substantially produces a uniform distribution of said activator in volume of said metal.

13. A composition according to claim 1, wherein said composition serves as an energy and hydrogen storage.

14. A method for producing hydrogen comprising reacting the composition according to claim 1 with water.

15. The method according to claim 14, wherein said reacting is at a pH of between 4 and 10.

16. The method according to claim 14, wherein the temperature of said water is between 5-100° C.

17. The method according to claim 14, wherein the water is selected from the group comprising: pure water, tap water, river water, lake water, rain water, waste water, and marine water.

18. The method according to claim 14, wherein the water is comprised in urine.

19. The method according to claim 18, being for hydrogen production in a manned spacecraft.

20. The method according to claim 18, being for waste management.

21. The method according to claim 18, wherein hydrogen is used for a fuel cell to produce power (electricity) and drinking water.

22. The method according to claim 14, wherein said hydrogen is used for power generation.

23. The method according to claim 22, wherein said power generation is accomplished via hydrogen fuel cell.

24. A method for producing a composition for producing hydrogen upon reaction of the composition with water, the method comprising: providing a metal; and adding to the metal an activator, said metal being aluminum (Al) and said activator being lithium hydride, said activator being in an amount that facilitates the reacting of said metal with water to produce reaction products which include hydrogen, wherein said composition is in a form of a solid solution of said activator or of chemical components thereof in said metal, and an amount of said activator and an amount of said aluminum are in a ratio of below 1:30 by weight.

25. The method according to claim 24, wherein said metal is configured in a physical form selected from a group comprising powders, particles, flakes, chips, pieces, plates, sheets and bands.

26. The method according to claim 24, wherein adding said activator comprises deposition of said activator on the surface of said metal.

27. The method according to claim 26, wherein said deposition comprises dissolving said activator in a non-aqueous solvent.

28. The method according to claim 27, wherein said deposition comprises adding said metal to a solution of said activator in said non-aqueous solvent.

29. The method according to claim 28, wherein said deposition further comprises evaporation of said solvent.

30. The method according to claim 29, wherein said non-aqueous solvent is liquid ethyl ether anhydrous.

31. The method according to claim 26, and further comprising heating said metal having said activator deposited on its surface.

32. The method according to claim 31, wherein said heating is done at temperature below melting point of the metal.

33. The method according to claim 31, wherein said heating is done in inert gas atmosphere.

34. The method according to claim 31, wherein said heating results in diffusion of said activator or of chemical components thereof from the surface of said metal to inner layers of said metal.

* * * * *